US006460893B1

United States Patent
McGrath

(10) Patent No.: US 6,460,893 B1
(45) Date of Patent: Oct. 8, 2002

(54) BELLOWS SEAL WITH LATERALLY OFFSET ADJUSTED LINER

(75) Inventor: David F. McGrath, Garden Ridge, TX (US)

(73) Assignee: Senior Investments AG (CH)

( * ) Notice: Subject to any disclaimer, the term of this patent is extended or adjusted under 35 U.S.C. 154(b) by 0 days.

(21) Appl. No.: 09/604,338

(22) Filed: Jun. 27, 2000

(51) Int. Cl.$^7$ .............................................. F16L 11/12
(52) U.S. Cl. ..................... 285/49; 285/299; 285/300; 285/301
(58) Field of Search ..................... 285/49, 299–301

(56) References Cited

U.S. PATENT DOCUMENTS

| | | |
|---|---|---|
| 2,752,172 A | 6/1956 | Ziebold |
| 3,359,014 A | 12/1967 | Clements |
| 3,460,856 A * | 8/1969 | Van Tine et al. .............. 285/53 |
| 3,552,776 A | 1/1971 | Leymann |
| 4,186,949 A | 2/1980 | Bartha et al. |
| 4,289,338 A | 9/1981 | Cook |
| 4,369,647 A | 1/1983 | Shigemori et al. |
| 4,511,162 A | 4/1985 | Broyles |
| 4,557,139 A | 12/1985 | Cantwell et al. |
| 4,644,780 A | 2/1987 | Jeter |
| 4,648,934 A | 3/1987 | Kiss |
| 4,712,938 A | 12/1987 | Seshamani et al. |
| 4,732,413 A | 3/1988 | Bachmann et al. |
| 5,357,781 A | 10/1994 | Tikijian |
| 5,358,284 A | 10/1994 | Broyles |
| 5,496,628 A * | 3/1996 | Ribbans ...................... 442/391 |
| 5,625,141 A | 4/1997 | Mahoney et al. |
| 5,653,474 A * | 8/1997 | Ninacs et al. ................ 285/301 |
| 5,658,024 A * | 8/1997 | Bachmann et al. ......... 285/299 |
| 6,027,147 A * | 2/2000 | Elliott ......................... 285/49 |
| 6,131,955 A | 10/2000 | Bachmann et al. |
| 6,131,960 A | 10/2000 | McHughs |
| 6,210,147 B1 | 4/2001 | Mori |
| 6,294,488 B1 * | 9/2001 | Tippett ....................... 442/289 |

\* cited by examiner

Primary Examiner—Lynne H. Browne
Assistant Examiner—Aaron Dunwoody
(74) Attorney, Agent, or Firm—Dick and Harris

(57) ABSTRACT

An expansion joint for high temperature air or other gaseous flows, of the type in which two duct ends are separated by a gap, that is bridged by overlapping inner and outer liner ducts. The inner and outer liner ducts are surrounded by at least one insulating pillow. The periphery of the expansion joint is surrounded by a flexible cover. A bellows liner structure is disposed between the inner and outer liner ducts and the at least one insulation pillow.

10 Claims, 6 Drawing Sheets

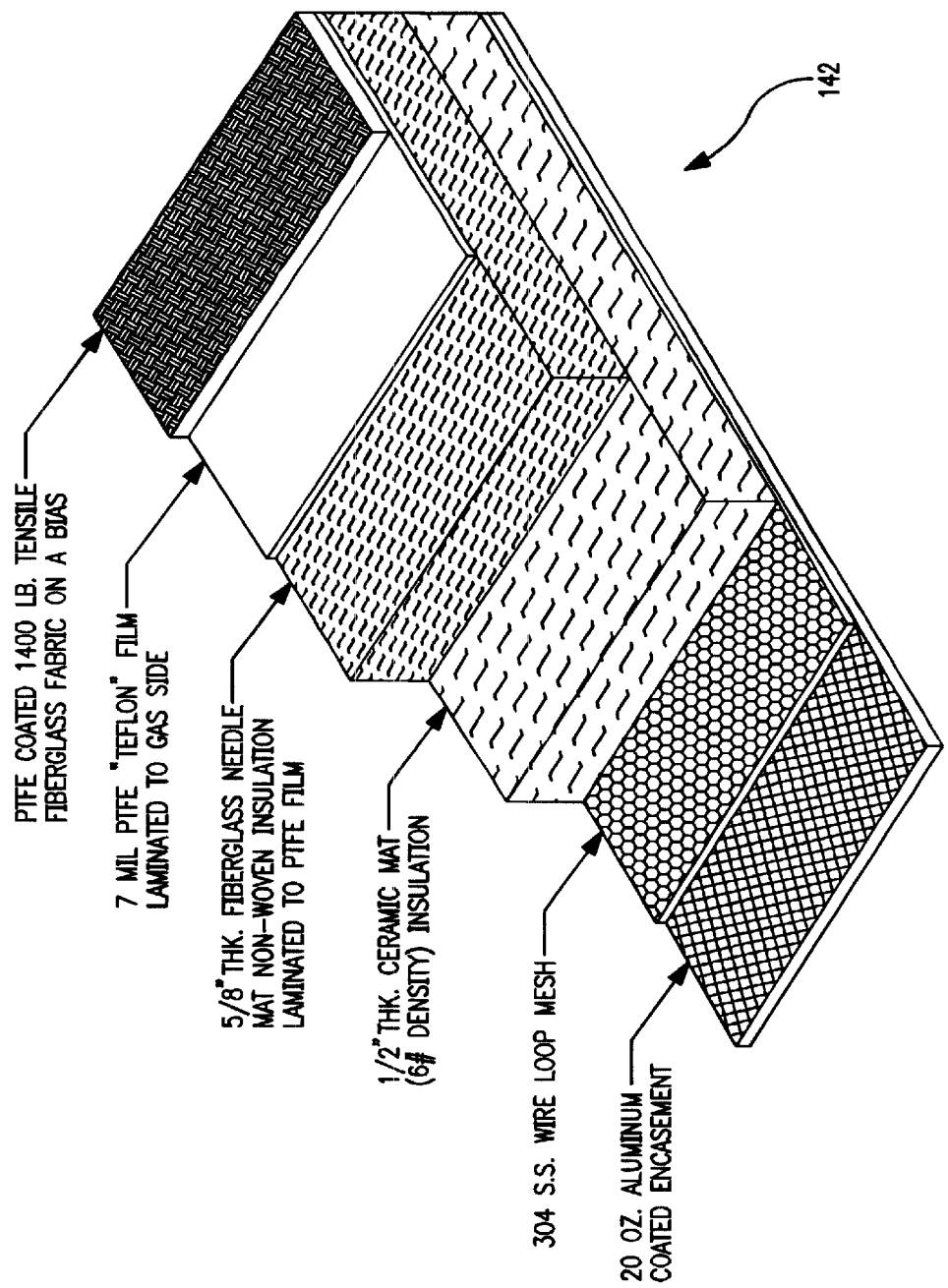

BELLOWS SEAL WITH LATERALLY OFFSET ADJUSTED LINER

BACKGROUND OF THE INVENTION

1. Field of the Invention

The present invention is directed to constructions for expansion joints for ducting, for example, such as may be used for the exhaust for large stationary gas turbines for the generation of electrical power, and for other ducting environments, especially those involving high temperature and/or substantial flow pulsations or turbulent flow.

2. Prior Art

Ducting which is used to transport air or other gaseous flows that are subject to substantial pulsations or turbulent flow or wide variations in pressure or flow rate, or which has wide variations in temperature range, typically must be provided with expansion joints that will enable the ducting to expand or contract to accommodate such dimensional variations as may be caused by extremes of pressure or temperature variation. In addition, if the ducting is connected to a air or other gaseous flow source that is pulsating, vibrating or in some other form of movement, expansion joints are also necessary in order to accommodate such dimensional changes or movements, without transmitting the stresses, vibrations or movements along the ducting. Otherwise, the ducting might be subject to leakage or failure entirely.

One example of an environment in which such ducting is necessary is that of a stationary gas turbine that is used for electrical power generation. Expansion joints for ducting for gas turbines must be able to accommodate relative axial movements of the duct ends on opposite side of the joint, as well as relative vertical and/or horizontal movements of the duct ends.

A joint for use with ducting such as used in association with such moving air or other gaseous flow sources is typically formed by creating a gap in the ducting (which ducting typically may be round or rectangular in cross-section). Inner and outer liner duct structures are then affixed to the opposing duct ends. The inner and outer liner duct structures are in overlapping telescopic relation to one another, with the inner liner duct structures on the upstream side of the joint. In this way, the force of the gas flow, during ordinary operating conditions, has less of a tendency to drive the gases between the overlapping portions of the inner and outer liner duct structures. A relatively close fit between the overlapping portions is provided, so that the impact of high-magnitude pulsations or turbulent flow in the air or other gaseous fluid flow, on the remaining surrounding expansion joint structure, is reduced.

Because of the need for longitudinal and vertical movement accommodation, the expansion joint may or may not be a monolithically formed structure that is uniformly constructed around its periphery. The inner and outer liner duct structures on the top and bottom of the expansion joint may overlap one another in regions extending across the width of the joint, and relative movement of the inner and outer duct liner structures is in the longitudinal direction. In addition, the junction of the liner duct structure, at one end of the joint, is provided with a vertical slip feature, that permits one end of the joint to move, for example, several inches up or down, relative to the other end, without creating any gaps that would permit pulsations or turbulent flow of the air or other gaseous flow to affect the remaining surrounding expansion joint structure.

To the outside of the liner duct structure, a plurality of insulating pillows is arranged, so as to further prevent leakage of the exhaust gases through the joint, and to prevent heat loss through the joint. Typically, several layers of insulating pillows are used.

Finally, a high-temperature flexible belt is provided to create the flexible outer skin of the expansion joint, connecting the portions of the duct on opposite sides of the gap.

Such a construction is generally effective in providing accommodation for vibratory or other movements, as well as dimensional changes imposed by thermal or pressure variations in the operating regime of the duct. However, because the inner and outer liner duct structures must have some clearance, in order to permit relative movement, of necessity gases will infiltrate the passages between the liner structures. As these gases are often very high temperature and/or corrosive, they can contribute to the degradation of the insulation pillows.

Accordingly, it would be desirable to provide a means for reducing degradation of insulation pillows in such expansion joints, by providing increased protection of the insulation pillows, and reduced likelihood of effect on the insulation pillows arising from pulsations and/or turbulence in the air or other gaseous flow.

This and other desirable characteristics of the present invention will become apparent in view of the present specification, including claims, and drawings.

SUMMARY OF THE INVENTION

The present invention is directed to an expansion joint for flexibly connecting first and second duct ends. The expansion joint has a longitudinal axis, and a periphery.

The expansion joint comprises an inner liner duct structure, operably affixed to and extending substantially longitudinally from the first duct end toward the second duct end. The inner liner duct structure extends substantially along the inner periphery of the first duct end. An outer liner duct structure is operably affixed to and extending substantially longitudinally from the second duct end toward the first duct end. The outer liner duct structure extends substantially along the inner periphery of the second duct end. The inner liner duct structure at least partially longitudinally overlaps the outer liner duct structure. The inner and outer liner duct structures define a flow path through the expansion joint.

At least one insulation pillow member is operably positioned substantially outside of the inner and outer liner duct structures, relative to the flow path. The at least one insulation pillow is further operably disposed between the first and second duct ends for providing pulsation damping between the first and second duct ends, and/or for providing thermal insulation for retarding the migration of heat from the expansion joint.

A flexible sealing cover peripherally surrounds the at least one insulation pillow member, and substantially sealingly connecting the first duct end to the second duct end.

A bellows liner structure is operably disposed between the inner and outer liner duct structures, and is oriented to the inside of the at least one insulation pillow member. The bellows liner structure is engaged in a compressive, substantially sealing relationship, relative to the inner and outer liner duct structures, for substantially precluding exposure of the at least one insulation pillow member to air or other gaseous from the flow path that can infiltrate past the overlapping inner and outer liner duct structures.

Preferably, the bellows liner structure comprises at least one distinct bellows liner member disposed about at least a portion of the periphery of the expansion joint, between the inner and outer liner duct structures, and the at least one insulation pillow member.

In a preferred embodiment of the invention, at least one distinct bellows liner member is disposed along a bottom side of the expansion joint, and affixed at at least one end thereof, to one of the inner and outer liner duct structures. In an embodiment of the invention, at least one distinct bellow liner member may have one end that is free to slide relative to one of the inner and outer liner duct members, when the expansion joint undergoes axial dimensional changes.

Preferably, the at least one insulation pillow member comprises an inner insulation layer; an intermediate layer; and an outer covering. The inner insulation layer is preferably fabricated from at least one insulating material selected from the group consisting of: fiberglass; ceramic mat, wire screen or mesh, woven fiberglass or ceramic blankets. The intermediate layer is preferably fabricated from metal mesh material. The outer covering is preferably fabricated from a metal coated layer of woven fabric material. The woven fabric material is preferably fiberglass.

The flexible sealing cover may comprise an innermost layer of fiberglass fabric; a layer of film made of polytetrafluoroethylene (PTFE) sometimes sold under the registered mark Teflon®; a layer of metal loop mesh; and an outer layer of metal coated fiberglass.

BRIEF DESCRIPTION OF THE DRAWINGS

FIG. 6 is a perspective cutaway view of a high temperature composite belt in accordance with the principles of the invention.

DETAILED DESCRIPTION OF THE DRAWINGS

Figure 1:
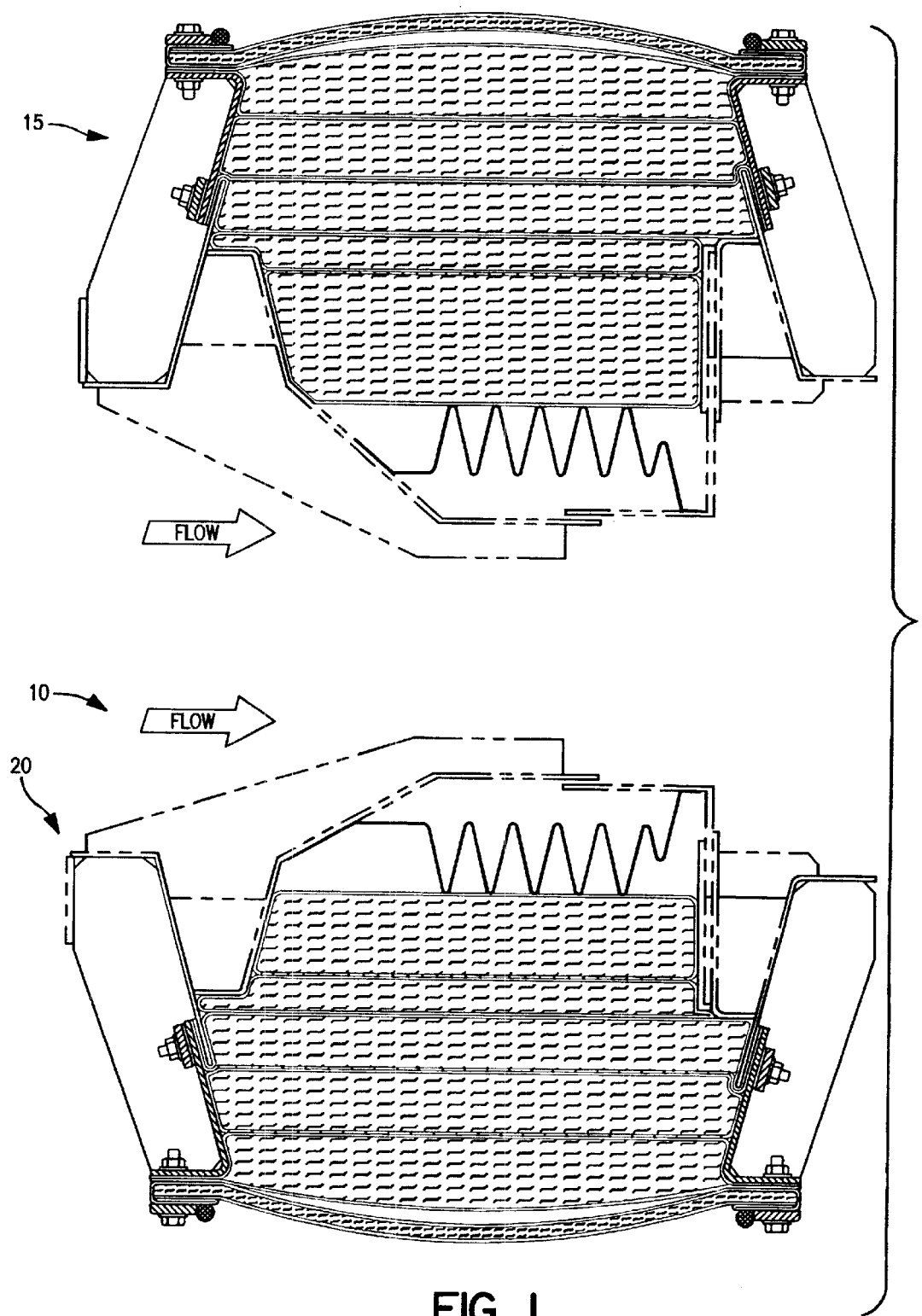
FIG. 1 is a side elevation, in section, of an expansion joint constructed in accordance with the principles of the present invention, showing cross-sectional views of a top portion of an expansion joint and a bottom portion of an expansion joint. The vertically extending side portions of the expansion joint are not shown.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

Figure 2:
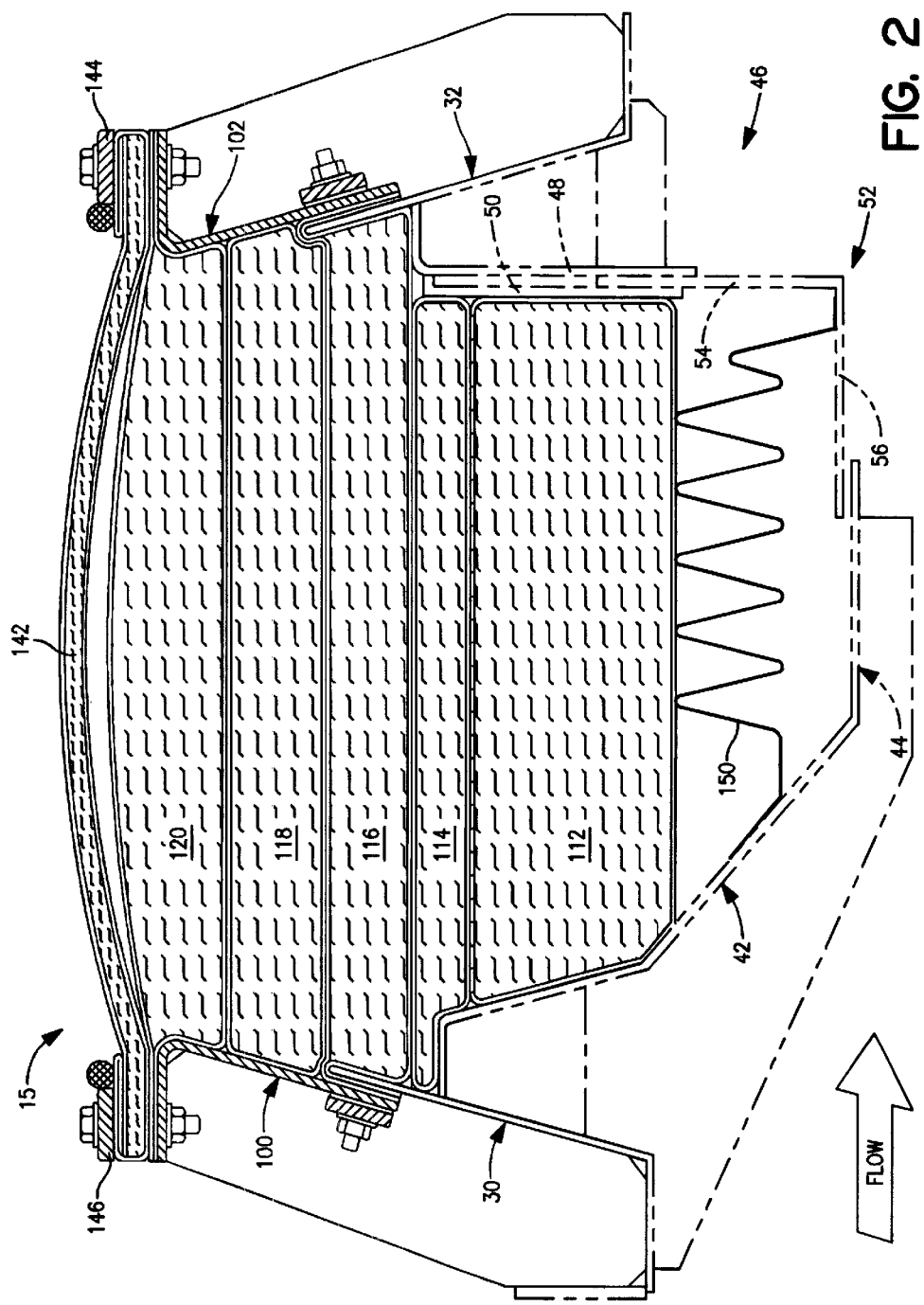
FIG. 2 is an enlarged view of the top cross-section of FIG. 1.
Figure 3:
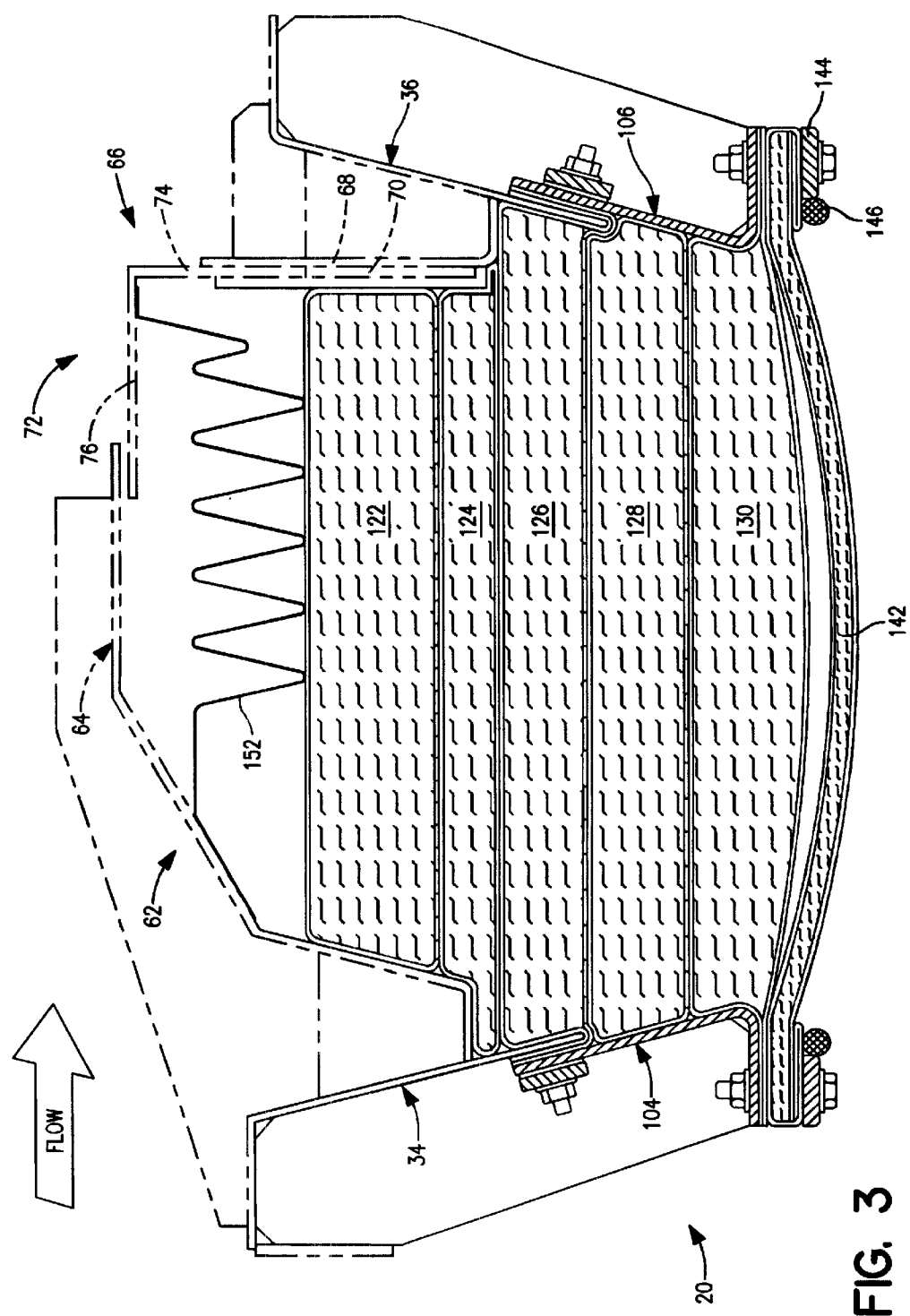
FIG. 3 is an enlarged view of the bottom cross-section of FIG. 1
Figure 4:
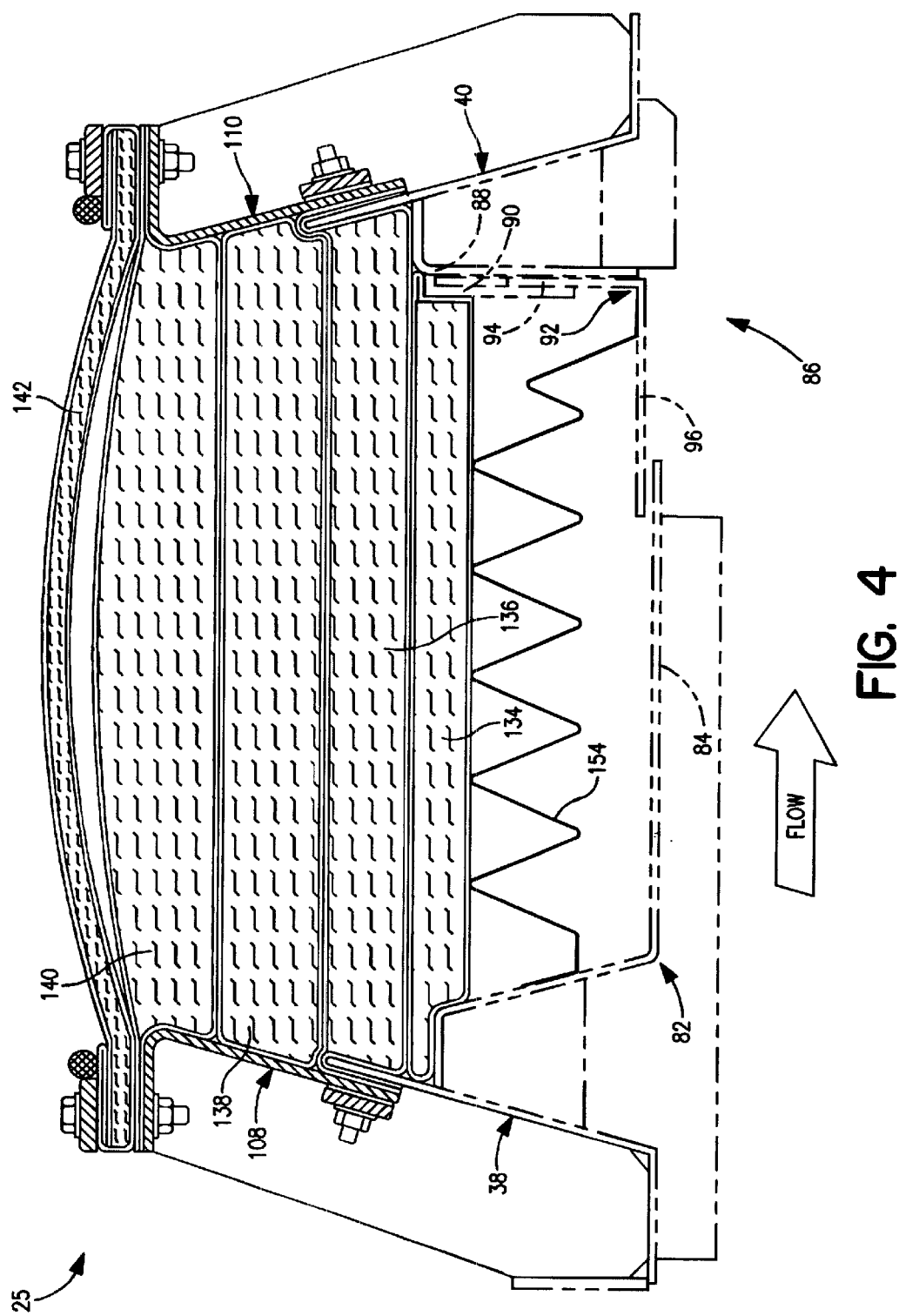
FIG. 4 is a top elevation, in section, of the expansion joint of FIG. 1, showing the layers of one side of the expansion joint. The section of the opposite side of the expansion joint is arranged in mirror image to the section of FIG. 4.
Figure 5:
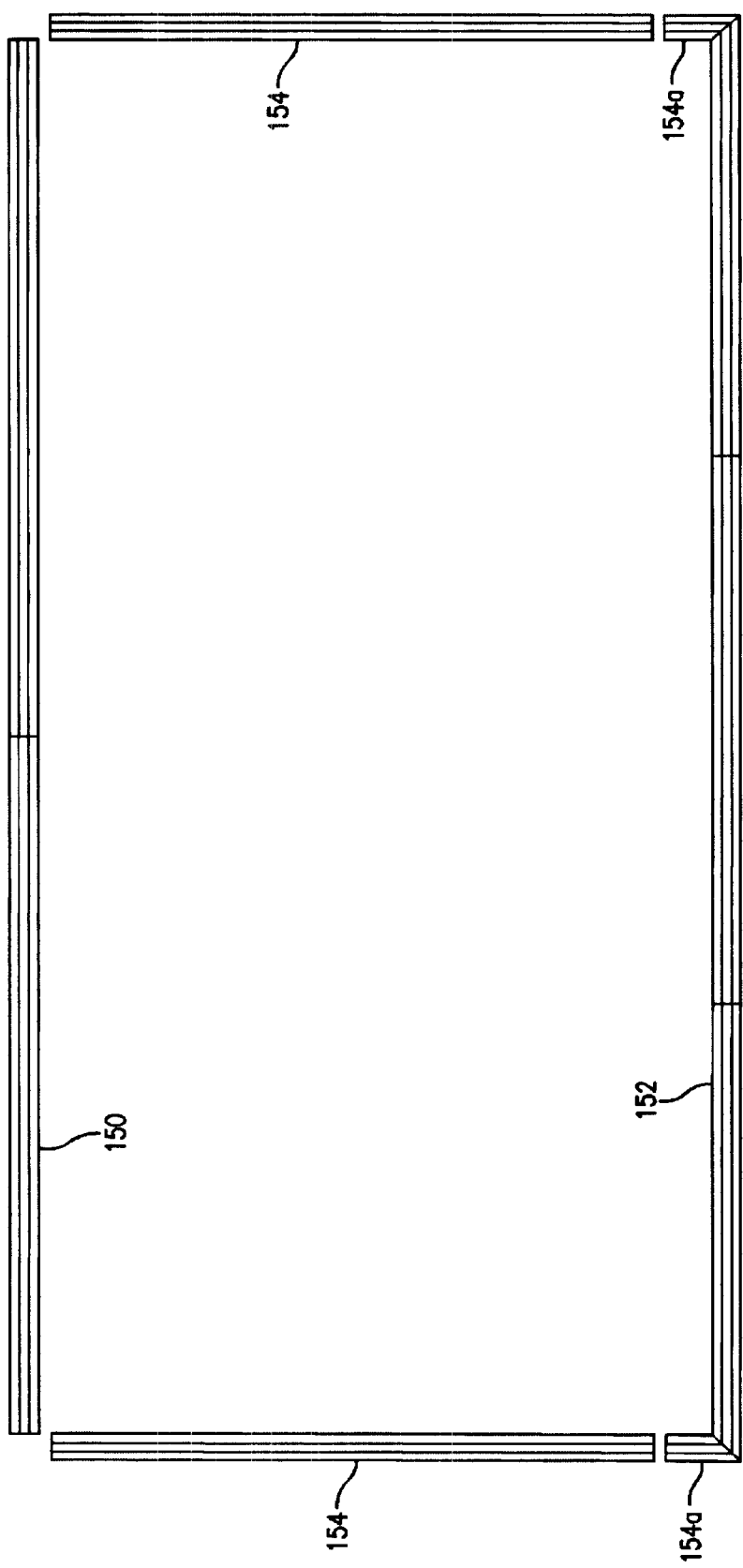
FIG. 5 is a front elevation of a bellows liner, according to a preferred embodiment of the invention.

Expansion joint 10 is shown in FIGS. 1–6, wherein the components forming the joint, per se, are shown in solid lines. The structure forming the opposing duct ends, on opposite sides of the gap, are shown in broken lines. FIGS. 1–3 represent cross-sectional views of the top portion 15, and bottom portion 20 of the expansion joint, for example taken at positions midway across the width of the expansion joint 10. FIG. 4 illustrates a cross-sectional view, looking down (or up) on side portion 25 of expansion joint 10.

The expansion joint 10 shown in the drawings, has a generally rectangular cross-section, when viewed in the direction of flow. However, other cross-sectional configurations may be employed, such as oval, or circular.

Referring to FIGS. 1–4, the ends of the duct that form the opposite sides terminate in outwardly flared flanges. The remaining portions of the ducts that extend away from the joint 10 are not shown. Flanges 30 and 32 are the flanges for the opposing top duct sides. Flanges 34 and 36 are the flanges for the opposing bottom duct sides. Flanges 38, 40 are the flanges for the opposing vertical duct edges for one side of the duct. It is to be understood that the vertical duct edges on the opposite side of the duct will be mirror images of the duct flanges of FIG. 4.

Liner duct structures, as previously described, are formed into or attached to each of the flanges. For each of FIGS. 2–4, each liner structure is understood to be shown in cross-section, and are understood to actually extend across the width of each of the top, bottom and side sections.

For example, for top section 15, inner liner duct structure 42 emanates from flange 30, terminating in web 44. Outer liner duct structure 46 includes first and second walls 48 and 50, that are longitudinally spaced from one another. Angled member 52 has one web 54 that is slidably received between first and second walls 48 and 50. Web 56 extends parallel to and to the outside of web 44. At all times there is at least some longitudinal overlap of web 44 and web 56.

For bottom section 20, inner liner duct structure 62 emanates from flange 34, terminating in web 64. Outer liner duct structure 66 includes first and second walls 68 and 70, that are longitudinally spaced from one another. Angled member 72 has one web 74 that is slidably received between first and second walls 68 and 70. Web 76 extends parallel to and to the outside of web 64. At all times there is at least some longitudinal overlap of web 64 and web 76.

For side section 25, inner liner duct structure 82 emanates from flange 38, terminating in web 84. Outer liner duct structure 86 includes first and second walls 88 and 90, that are longitudinally spaced from one another. Angled member 92 has one web 94 that is slidably received between first and second walls 88 and 90. Web 96 extends parallel to and to the outside of web 84. At all times there is at least some longitudinal overlap of web 84 and web 96.

As can be seen the overlapping webs accommodate axial extension and contraction of the joint. By joining the angled members 52, 72, 92 (and the present but not shown other side angled member), a free-floating frame is created, at the downstream end of the joint that is capable of accommodating vertical or horizontal movement of one duct end relative to the opposite duct end. The movement of the free-floating frame, relative is then dictated by the movement of the upstream end of the joint, which causes the inner liner duct structure to push up or down or back and forth against the frame. Note that the liner duct structures are not symmetrical, relative to the top, bottom and sides. The liner duct structures may or may not be symmetrically arranged, as desired or as dictated by the requirements of any given application.

The upstream ends of the inner liner duct structures typically will be sloped, as shown in FIGS. 2–4, although in alternative embodiments, they may be formed with right angle cross-sections, as the downstream ends of the outer liner duct structures are formed.

On each of the top, bottom and sides, pluralities of insulation pillows are provided. The insulation pillows also provide cushioning and damping of vibrations, to help prevent propagation of vibrations from one duct end, to the other. The insulation pillows may or may not be held in place partially by angled members that are bolted to the outwardly extending flanges emanating from the duct ends.

For example, angled members 100, 102 are bolted to flanges 30, 32. Angled members 104, 106 are bolted to flanges 34, 36, and angled members 108, 1 10 are bolted to flanges 38, 40 (and similar angled members are bolted to corresponding flanges on the opposite vertical side of the expansion joint.

Top section 15 is provided with five layers of insulation pillows 112, 114, 116, 118 and 120. Pillow 112 may be formed from an insulating material, such as, but not limited to, fiberglass or ceramic mat, surrounded by an aluminized fiberglass encasement and an outer stainless steel mesh encasement sleeve. Pillow 114 may be formed from an insulating material as described above, surrounded by an aluminized fiberglass encasement surrounded by a stainless steel mesh encasement sleeve. Pillow 116 may be formed from an insulating material as described above, surrounded by an aluminized fiberglass encasement, surrounded by a suitable high temperature gas barrier, as are known in the art. Pillow 118 may be formed from an insulating material as described above, by aluminized fiberglass, surrounded by stainless steel mesh. Finally, pillow 120 may be formed from insulating material as described above, surrounded by aluminized fiberglass, surrounded by stainless steel mesh.

In bottom section 20, pillow 122 may be formed in a similar manner as pillow 112; pillow 124 may be formed in a similar manner as pillow 114; pillow 126 may be formed in a manner similar to pillow 116; pillow 128 may be formed in a similar manner as pillow 118; and pillow 130 may be formed in a similar manner as pillow 120.

In side section 25 (and its corresponding opposite side section), the innermost pillow 134 may be formed in a manner similar to pillows 114 and 124; pillow 136 may be formed in a manner similar to pillows 116 and 126; pillow 138 may be formed in a manner similar to pillows 118 and 128; and pillow 140 may be formed in a manner similar to pillows 120 and 130.

It is to be understood that the number, arrangement and manner of construction of the pillows is described and illustrated simply as one preferred embodiment of the invention, and that changes may be made in the particulars, as desired or dictated by the requirements of any given application, by one of ordinary skill in the art.

A flexible, high-temperature, composite belt 142 surrounds and seals the entire periphery of joint 10. A preferred construction of composite belt 142 is shown in FIG. 6. Belt 142 is preferably continuous around the periphery of the joint and is preferably formed as a continuous loop without gaps, although the formation of the loop may require one or more longitudinally extending seams (not shown). Bolts or studs affix the upstream and downstream edges of belt 142, at preferably regularly spaced intervals along the periphery of the joint. Backup bars 144 and/or gaskets 146 may be provided as necessary, to further reduce the amount of leakage of gases from the joint.

A salient feature of the present invention, that helps to preserve the insulation pillows, by reducing the amount of exposure of the pillows to the 5 effects of pulsations and/or potentially high turbulence of hot, potentially corrosive gases, are top bellows liner 150, bottom bellows liner 152 and side bellows liner 154 (and its corresponding opposite side bellows liner that is not shown, but understood to be a mirror image). Each bellows liner is shown in cross-section. It is understood that each bellows liner preferably has a substantially constant cross-section across its width/height. Each bellows liner is preferably fabricated from a 400-series stainless steel, for improved resistance to heat and corrosion.

While in one preferred embodiment, four bellows liners are employed, depending upon the configuration of the expansion joint, greater or fewer numbers and differing configurations of bellows liners may be employed.

In a preferred embodiment, the bellows liner(s) is/are installed in a neutral configuration, with respect to axial stress, so that when the expansion joint itself is in a neutral configuration, the bellows liners are neither compressed nor stretched.

Alternatively, in an alternative embodiment, each bellows liner, when installed, may be provided with a compressive preload. In such an alternative embodiment, even when the joint is at its maximum designed extension, the bellows liners are all still under compression, so as to bear against their respective adjacent inner and outer liner duct structures, to facilitate resistance to passage of gases past the bellows liners to the insulation pillows.

Bottom bellows liner 152 preferably, may be seal-welded, across its width, at both the front end (upstream) and the back end (downstream), although in other embodiments, the bottom bellows liner may be welded along only one end, or at neither end. The side bellows liners may be non-sealingly welded, along their vertically extending up- and/or downstream ends, or at neither end. Similarly, the top bellows liner may be non-sealingly welded, at one or both ends, or at neither end.

In the embodiment of FIGS. 2–4, top bellows liner 150 is tack welded (e.g., spot welded every 2–6 inches) at its downstream end; bottom bellows 152 is seal welded at its downstream end and may be welded at its upstream end as well; and the side bellows liners may be tack welded at their downstream ends.

The downstream end of bottom bellows liner 152 may be welded to the adjacent web 76 of outer liner duct structure 66. In addition, truncated side bellows liners 154*a* may or may not be affixed, at their downstream ends, to bottom bellows liner 152.

During operation of the gas turbine, the opposing duct ends may be prompted, through flow pulsations or vibration or thermal stresses, to move toward and away from one another. When the duct ends move toward each other, the bellows liners will compress, and the angled upstream ends will slide up the slopes of the angled portions of the inner liner duct structures. When the duct ends move away from one another, the bellows liners may be axially unloaded, partially, and the angled upstream ends (if not welded in place) will slide down the slopes of the angled portions of the inner liner duct structures. In those embodiments in which both ends of any given bellows liner are welded in place, the bellows liner will be stretched in response to the relative movement of the duct ends away from each other. In those embodiments in which the upstream ends of the inner liner duct structures are squared in cross-section, the ends of the bellows liners may be formed with straight webs, so that the end edges may bear against the "corner" of such squared cross-section inner liner duct ends.

The presence of the bellows liners not only helps to reduce the amount of exposure of the insulation pillows to gases, during ordinary operations, but also when there are pulsations or turbulent flow of the gas flow. In addition, it is known that typically gas turbines are shut down from time to time, and flushed with various corrosive cleaning agents for the removal of soot and other deposits. These cleaning agents can migrate downstream from the turbine during the cleaning process, and can be particularly damaging to the insulation pillows and other structure of the expansion joint. The presence of the bellows liners helps to reduce the mount of exposure of the other expansion joint components to such corrosive cleaning agents.

The foregoing description and drawings merely explain and illustrate the invention, and the invention is not limited except insofar as the appended claims are so limited, as those skilled in the art who have the disclosure before them will be able to make modifications and variations therein without departing from the scope of the invention.

We claim:

1. An expansion joint for flexibly connecting first and second duct ends, the expansion joint having a longitudinal axis and a periphery, the expansion joint comprising:

an inner liner duct structure, operably affixed to and extending substantially longitudinally from the first duct end toward the second duct end, the inner liner duct structure extending substantially along an inner periphery of the first duct end;

an outer liner duct structure, operably affixed to and extending substantially longitudinally from the second duct end toward the first duct end, the outer liner duct structure extending substantially along an inner periphery of the second duct end;

the inner liner duct structure at least partially longitudinally overlapping the outer liner duct structure;

the inner and outer liner duct structures defining a flow path through the expansion joint;

at least one insulation pillow member operably positioned substantially outside of the inner and outer liner duct structures, relative to the flow path, the at least one insulation pillow member further being operably disposed between the first and second duct ends for providing at least one of pulsation damping between the first and second duct ends, and thermal insulation for retarding the migration of heat from the expansion joint;

a flexible sealing cover peripherally circumferentially surrounding the at least one insulation pillow member, and substantially sealingly connecting the first duct end to the second duct end; and a resilient bellows liner structure, operably disposed between the inner and outer liner duct structures, and oriented to the inside of the at least one insulation pillow member, and engaged in a compressive, substantially sealing relationship, relative to the inner and outer liner duct structures, for substantially precluding exposure of the at least one insulation pillow member to air or other gaseous material from the flow path that can infiltrate past the overlapping inner and outer liner duct structures.

2. The expansion joint according to claim 1, wherein the bellows liner structure comprises:

at least one distinct bellows liner member disposed about at least a portion of the periphery of the expansion joint, between the inner and outer liner duct structures, and the at least one insulation pillow member.

3. The expansion joint according to claim 2, wherein the at least one distinct bellows liner member is disposed along a bottom side of the expansion joint, and at least one end thereof is affixed to one of the inner and outer liner duct structures.

4. The expansion joint according to claim 2, wherein the at least one distinct bellows liner member has one end that is free to slide relative to one of the inner and outer liner duct members, when the expansion joint undergoes axial dimensional changes.

5. An expansion joint for flexibly connecting first and second duct ends, the expansion joint having a longitudinal axis and a periphery, the expansion joint comprising:

an inner liner duct structure, operably affixed to and extending substantially longitudinally from the first duct end toward the second duct end, the inner liner duct structure extending substantially along an inner periphery of the first duct end;

an outer liner duct structure, operably affixed to and extending substantially longitudinally from the second duct end toward the first duct end, the outer liner duct structure extending substantially along an inner periphery of the second duct end;

the inner liner duct structure at least partially longitudinally overlapping the outer liner duct structure;

the inner and outer liner duct structures defining a flow path through the expansion joint;

at least one insulation pillow member operably positioned substantially outside of the inner and outer liner duct structures, relative to the flow path, the at least one insulation pillow member further being operably disposed between the first and second duct ends for providing at least one of pulsation damping between the first and second duct ends, and thermal insulation for retarding the migration of heat from the expansion joint;

a flexible sealing cover peripherally circumferentially surrounding the at least one insulation pillow member, and substantially sealingly connecting the first duct end to the second duct end; and a resilient bellows liner structure, operably disposed between the inner and outer liner duct structures, and oriented to the inside of the at least one insulation pillow member, and engaged in a compressive, substantially sealing relationship, relative to the inner and outer liner duct structures, for substantially precluding exposure of the at least one insulation pillow member to air or other gaseous material from the flow path that can infiltrate past the overlapping inner and outer liner duct structures;

wherein the at least one insulation pillow member comprises:
an inner insulation layer;
an intermediate layer; and
an outer covering.

6. The expansion joint according to claim 5, wherein the inner insulation layer is fabricated from at least one insulating material selected from the group consisting of: fiberglass; ceramic mat, wire screen; wire mesh, woven fiberglass blankets; woven ceramic blankets.

7. The expansion joint according to claim 5, wherein the intermediate layer is fabricated from metal mesh material.

8. The expansion joint according to claim 5, wherein the outer covering is fabricated from a metal coated layer of woven fabric material.

9. The expansion joint according to claim 8, wherein the woven fabric material is fiberglass.

10. An expansion joint for flexibly connecting first and second duct ends, the expansion joint having a longitudinal axis and a periphery, the expansion joint comprising:

an inner liner duct structure, operably affixed to and extending substantially longitudinally from the first duct end toward the second duct end, the inner liner duct structure extending substantially along an inner periphery of the first duct end;

an outer liner duct structure, operably affixed to and extending substantially longitudinally from the second duct end toward the first duct end, the outer liner duct structure extending substantially along an inner periphery of the second duct end;

the inner liner duct structure at least partially longitudinally overlapping the outer liner duct structure;

the inner and outer liner duct structures defining a flow path through the expansion joint;

at least one insulation pillow member operably positioned substantially outside of the inner and outer liner duct structures, relative to the flow path, the at least one insulation pillow member further being operably disposed between the first and second duct ends for providing at least one of pulsation damping between the first and second duct ends, and thermal insulation for retarding the migration of heat from the expansion joint;

a flexible sealing cover peripherally circumferentially surrounding the at least one insulation pillow member, and substantially sealingly connecting the first duct end to the second duct end; and a resilient bellows liner structure, operably disposed between the inner and outer liner duct structures, and oriented to the inside of the at least one insulation pillow member, and engaged in a compressive, substantially sealing relationship, relative to the inner and outer liner duct structures, for substantially precluding exposure of the at least one insulation pillow member to air or other gaseous material from the flow path that can infiltrate past the overlapping inner and outer liner duct structures;

wherein the flexible sealing cover comprises:

an innermost layer of fiberglass fabric;

a layer of PTFE film;

a layer of metal loop mesh; and an outer layer of metal coated fiberglass.

* * * * *